Oct. 19, 1948.  G. R. DEMPSTER  2,451,721
TRANSPORTING AND DUMPING EQUIPMENT

Filed Feb. 19, 1945  3 Sheets-Sheet 1

Inventor
George R. Dempster
By Cameron, Kerkam & Sutton
Attorneys.

Oct. 19, 1948.   G. R. DEMPSTER   2,451,721
TRANSPORTING AND DUMPING EQUIPMENT
Filed Feb. 19, 1945   3 Sheets-Sheet 2
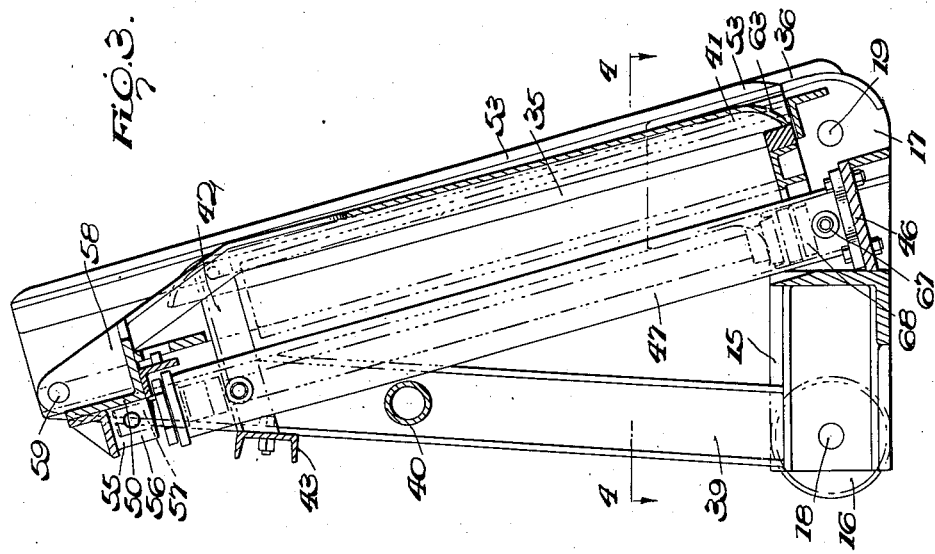
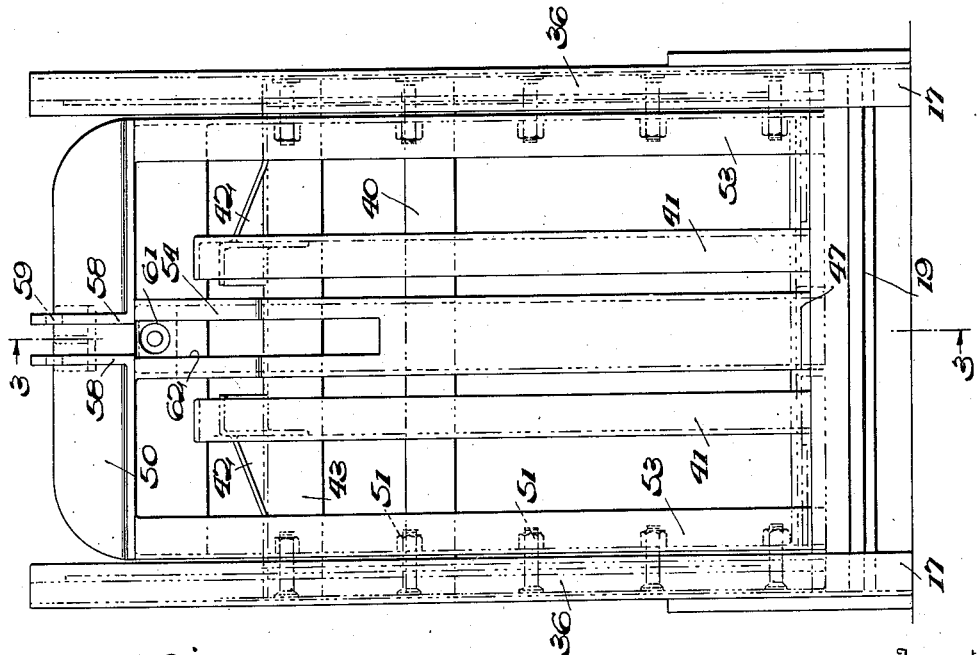
Inventor
George R. Dempster
By Cameron, Kerkam & Sutton
Attorneys

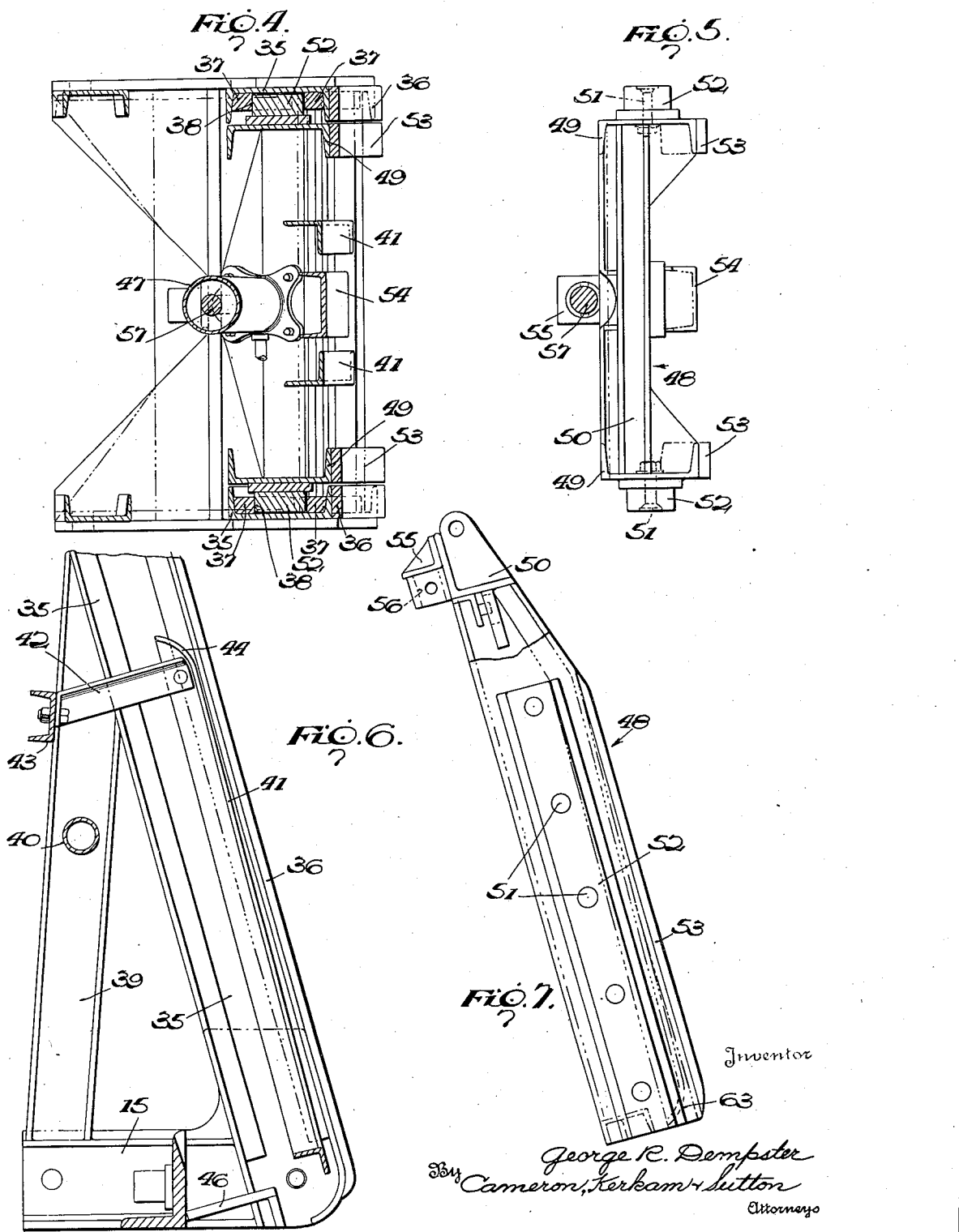

Patented Oct. 19, 1948

2,451,721

UNITED STATES PATENT OFFICE 2,451,721

TRANSPORTING AND DUMPING EQUIPMENT

George R. Dempster, Knoxville, Tenn.

Application February 19, 1945, Serial No. 578,714

6 Claims. (Cl. 214—77)

This invention relates to transporting and dumping equipment, and more particularly to equipment of the type characterized which is so constructed that its over-all height may be readily reduced to facilitate operation where the clearances are low without decreasing the utility of the equipment for lifting skips and other loads onto a truck chassis for transportation.

It has heretofore been proposed to provide a truck chassis with an upright skid frame and, in order to enable operation at reduced vertical clearances, to make the skid frame of telescopically movable sections which may be collapsed or extended as required. In devices of the type heretofore proposed, however, the construction has been such that the skid frame sections have been extended as an incident to lifting the skip or other load, while the latter has to be transported in an overhanging position with consequent decrease in the stability of the truck and load during transportation.

It is an object of this invention to provide equipment of the type characterized whereby the skip or other load may be raised and lowered whether the skid frame construction is in extended or contracted condition, that is in all positions of the extension skid frame with respect to the main skid frame.

Another object of this invention is to provide equipment of the type characterized whereby the load may be moved forwardly onto the truck chassis for transportation and at the same time the over-all height of the equipment may be readily contracted as required to permit the rig to pass through doorways or otherwise operate where the vertical clearance is less than the over-all height of the equipment when extended.

Another object of this invention is to provide equipment of the type characterized which is readily operated from the cab of the truck, which is composed of strong and rugged parts that are readily fabricated and assembled, and which is highly efficient in operation and control.

Other objects of the invention will appear as the description of the invention proceeds.

The invention is capable of receiving a variety of mechanical expressions, one of which is illustrated on the accompanying drawings, but it is to be expressly understood that the drawings are for purposes of illustration only, and are not intended to be a definition of the limits of the invention, reference being had to the appended claims for that purpose.

Referring in detail to the drawings, wherein the same reference characters are employed to designate corresponding parts in the several figures, Fig. 1 is a side elevation, somewhat schematic in character, of a truck chassis provided with equipment embodying the present invention;

Fig. 2 is a rear elevation of the equipment looking toward the cab of the truck;

Fig. 3 is a section on the line 3—3 of Fig. 2;

Fig. 4 is a section on the line 4—4 of Fig. 3;

Fig. 5 is a plan of the extensible section of the skid frame structure;

Fig. 6 is a side view, partly broken away, and to an enlarged scale, of the carriage with its main skid frames; and Fig. 7 is a like view of the extensible section of the skid frame structure.

Figure 1:
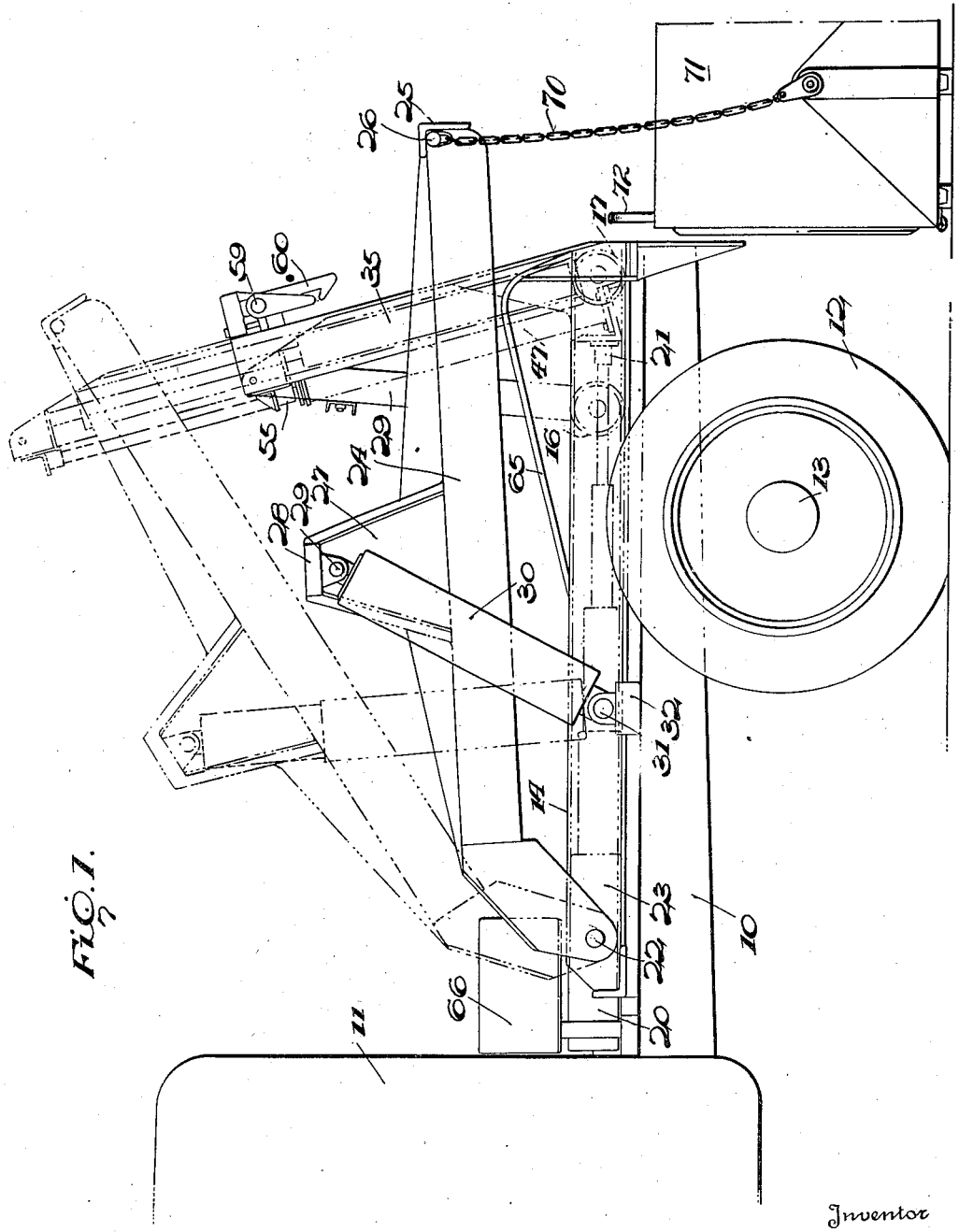

In the embodiment illustrated on the drawings by way of exemplification of the present invention, 10 designates the chassis of any suitable truck having a cab 11 and rear wheels 12 mounted on axle 13. The rig of the present invention may be permanently built into the chassis, or it may be provided with a separate base frame attached to the truck chassis in any suitable way. As shown, the base frame includes or carries a pair of fore and aft extending channel bars 14 having their recesses faced inwardly so as to provide a pair of parallel tracks for the carriage to be described. Mounted for movement forwardly and rearwardly of the chassis on said tracks 14 is a carriage 15 (see Figs. 3 and 6) provided with two pairs of rollers 16 and 17 mounted on axles 18 and 19, respectively, said rollers being of a diameter to be received within the channels of said tracks 14.

Mounted on the base frame is any suitable screw, hydraulic or other mechanism for moving said carriage forwardly and rearwardly on the tracks 14. As shown diagrammatically hydraulic mechanism 20 is mounted on the base frame adjacent its forward end and operatively connected to the carriage at 21. Said hydraulic mechanism may comprise either a single medially arranged device or a pair of rams disposed on either side of the structure, and it is preferably of that type which is composed of successive sections of progressively decreasing diameter so that the sections may be progressively telescoped one within the other when the carriage is to be moved forwardly or progressively extended one beyond the other when the carriage is to be moved rearwardly. As hydraulic mechanism of this type is well known in the art, the details have not been illustrated.

Suitably pivoted at 22 on anchor plates 23 fixed to the forward end of the base frame is a boom structure generally designated 24. In its preferred construction the boom structure is composed of a pair of arms extending rearwardly of the chassis and spaced so that when in the lowered position shown in solid line in Fig. 1 the two arms of the boom structure embrace the carriage 15 and the parts carried thereby. The boom structure may thus be lowered to a position such that it is well below the top of the parts mounted on the carriage 15. At their rear ends the two arms of the boom structure are connected by a suitable transverse member 25 so as to provide a rigid open rectangular construction pivoted at 22 and movable from the full line to the dotted line position in Fig. 1. The rearward extremities of the boom arms are provided with any suitable means whereby a skip or other load may be attached thereto, this being indicated diagrammatically by the pins 26 from which suitable chains 70 may depend for attachment, for example, to suitable connecting means on the end walls of skips of any suitable construction such as disclosed in my prior Patents Nos. 2,281,183, 2,305,148, etc.

For operating the boom structure the boom arms are provided with upwardly extending trapezoidal-shaped members 27 between which extends a transverse member 28. Member 28 has pivoted thereto at 29 suitable mechanism for raising and lowering the boom structure. As shown, this takes the form of hydraulic mechanism 30 which is also pivoted at 31 to a suitable anchor block 32 formed in or mounted on the framework of the rig. Either a single hydraulic device may be mounted in the medial plane of the rig or a pair of such devices may be used, one at each side of the boom structure. By admitting or releasing fluid under pressure to or from the mechanism 30 to extend or contract the same the boom structure 24 is moved from the full line position shown in Fig. 1 to the dotted line position shown in Fig. 1, the hydraulic mechanism pivoting with respect to the boom structure and the base frame about the pivotal axes 29 and 31 as the boom structure moves about its pivot 22.

The carriage with the parts mounted thereon is shown in greater detail in Figs. 2 to 7, inclusive. Suitably mounted on and united with said carriage at either side thereof is an upwardly and forwardly inclined skid frame member providing skid frames 35, preferably of channel-shaped cross section, as shown more particularly in Fig. 4, with the channels of said frames faced inwardly to provide tracks as next to be explained. The rear face of each channel 35 preferably has secured thereto in any suitable way a wear plate 36 on which the skip or other load is designed to slide as it is moved upwardly and downwardly on the skid frame structure. Referring more particularly to Fig. 4, each channel may be a track for a roller, but as shown the inner corners of the channel in each skid frame 35 have welded therein bars 37 of generally rectangular cross section and extending for substantially the full length of the skid frame 35, said bars being spaced to provide a trackway 38 which is also rectangular in cross section. The skid frames 35 are supported rigidly by uprights 39 suitably united with the carriage 15 and the upper extremities of said skid frames, and said uprights may in turn be strengthened and made rigid by one or more transverse members 40 to provide a structure of adequate rigidity and stiffness for the service to be performed.

Intermediate the skid frames 35 the carriage 15 is also provided with a pair of spaced bail guides 41 which are united with the body of the carriage at their lower ends in any suitable way, and at their upper ends they are rigidly supported by members 42 bolted or otherwise secured to a transverse member 43 carried by the uprights 39. At their upper ends said guides 41 are preferably curved forwardly as shown at 44 in Fig. 6. Carriage 15 is also suitably provided with a rigid abutment 46 on which is mounted an hydraulic cylinder 47 (see Fig. 3) rigidly attached to the carriage in any suitable way.

Mounted for movement in the tracks 38 is an extension skid frame generally designated 48. Said extension frame is preferably composed of a pair of inwardly facing channel bars 49 (see Fig. 4) and a transverse member 50 (see Fig. 2) suitably attached to the upper extremities of said channel bars 49. Suitably secured to the outer faces of the channel bars 49 as by bolts or rivets 51 are runners or series of runner blocks or rollers 52 of such dimension that they slide or roll in the tracks 38. The rear face of each channel bar 49 is also provided with a wear plate 53 whose outer face lies in the same transverse plane with the outer face of the adjacent wear plate 36 on channel bar 35. Transverse member 50 is of such construction and is so united to the side members 49 as to give requisite rigidity to the extension frame.

Projecting downwardly from said member 50 midway of the width of the extension frame is a single bail guide member 54 which (see Fig. 4) lies between the two bail guides 41 carried by the carriage proper. Suitably mounted on and projecting forwardly from the member 50 is a block 55 provided with a recess 56 in which is suitably secured the upper end 57 of the piston rod of the hydraulic mechanism 47. Also formed or mounted on the member 50 is a pair of lugs 58 suitably apertured at 59 to receive the pivot of an automatic hook, omitted from the detailed views but shown at 60 in Fig. 1. Said automatic hook may be of any suitable construction, it being shown as of the type that is actuated by a coil spring whose socket is shown at 61, bail guide 54 being slotted as shown at 62 to make suitable provision for the movement and operation of the automatic hook. Bail guide 54 is also preferably curved at its lower extremity as shown at 63.

The base frame or chassis may also be provided with an apron 64 extending downwardly below the lower extremities of the skid frames 35 carried by the carriage and against which the skip or other load will engage as it is moved upwardly by the boom structure 24 until it engages the lower extremities of the skid frames 35 carried by the carriage. The base frame or channel bars 14 may also be provided with forwardly inclined rests 65 upon which the skip or other load is designed to rest in its forward position as hereinafter explained.

It will be understood that suitable valve mechanism for controlling the operation of the hydraulic devices 20, 30 and 47 is provided, the valve chest being diagrammatically indicated at 66, and proper controls extend from the latter into the cab 11 of the truck so that the driver from his seat may in proper sequence operate the valves controlling the hydraulic devices 20, 30 and 47 to effect the operation of the equipment as next to be explained.

No particular skip or load is required for use in conjunction with the foregoing equipment, as said equipment may be used with a wide variety of skips and other forms of load, but by way of illustration a fragment of a skip 71 with bail 72 such as shown in Figs. 8 to 10 of my prior Patent No. 2,281,183, is shown in Fig. 1. Assuming that the parts are in the position illustrated in Fig. 1 with a loaded skip on the ground ready for transportation, the operation is as follows:

By suitable manipulation of the control in the cab 11 hydraulic mechanism 47 has fluid under pressure admitted thereto through the pipe 67 (Fig. 3) beneath the piston 68 to move the piston upwardly, and as the piston rod 57 is attached to the member 50 at the block 55, the extension skid frame composed of side members 49 and transverse member 50 is moved upwardly with the piston, the runners 52 sliding in the tracks 38 until the extension frame has reached its upper position. Any suitable stop may be provided if desired to prevent undue movement of the extension frame but this is ordinarily unnecessary as the throw of the piston 68 determines the extent of movement of said extension frame. In this position of the extension frame 48 the rear faces of the wear plates 53 are still in the same transverse plane with the rear faces of the wear plates 36, the same as they were before extension, so that the former constitutes an extension slightly inside of and for the most part above the latter but provides a substantially continuous surface for guiding the skip or other load in its upward movement.

Assuming the chains 70 or other means for attachment depending from the pins 26 are properly secured to the ends of the skip to be elevated, the proper control in the cab is operated to admit fluid under pressure to the hydraulic mechanism 30, moving the boom structure 24 around its pivot at 22 to raise the load from the ground. During its upward movement the load first engages the apron 64 and then is guided by the rear wear surfaces 36 and 53. When the load has been lifted above the base frame so that it is free to move over the same, suitable manipulation of the control in the cab effects the operation of the hydraulic mechanism 20 with consequent movement of the carriage 15 from its rearmost to its forwardmost position where it is in vertical alignment with the rests 65. Thereupon the hydraulic mechanism 30 may be lowered to deposit the load on said rests. If the loaded truck is to be taken through a door or other opening which will not pass the extension frame in its elevated position, the hydraulic mechanism 47 may again be operated to lower the extension frame 48 to the extent necessary to pass through the opening.

At the place of deposit the extension frame is again lifted if it has been lowered, the hydraulic mechanism 20 is operated to move the carriage to its rearmost position, and the hydraulic mechanism 30 is operated to lift the load from the rests 65 for deposit on the ground, or if dumping is to be effected the skip is raised by the hydraulic mechanism 30 until the bail of the skip is engaged with the automatic hook 60, whereupon the boom structure 24 is again lowered to effect dumping in a manner well understood in the art.

If the skip is provided with a pivoted bail as indicated at 72 it is guided on the guide members 41, 54 during raising and lowering of the skip. When the extension frame is in its lowered position the single bail guide member 54 lies between the bail guide members 41, and the three members have their rear surfaces in a common plane. When the extension frame is elevated the rear surface of the guide member 54 in effect constitutes a continuation of the guide surfaces provided by the rear faces of the spaced members 41.

It will be observed that the mechanism for raising and lowering the load comprising the boom structure 24 and the hydraulic mechanism 30 is equally operable whether the extension frame 48 is in its lowermost position or has been moved to its uppermost or any intermediate position. Hence it is possible to operate the mechanism for raising and lowering the load without respect to the extension of the skid frame structure, and therefore it is possible to operate the mechanism for raising and lowering the load under conditions where the extension frame cannot be moved to its uppermost position or even elevated with respect to the skid frames carried by the carriage. Thereby the equipment of the present invention is susceptible to use under conditions not possible where elevation of the load is accompanied by extension of the skid frame.

It will further be observed that when the extension frame is in its lowered position as shown in Fig. 1, the boom structure can be disposed so that it also is materially below the top of the parts carried by the carriage. Hence the rig can readily pass through openings of reduced clearance. At the same time the skid frame may be extended to the full height heretofore considered desirable whenever such is deemed necessary. Additionally, the foregoing results are obtained in a construction which also provides for the load being moved forwardly with respect to the chassis frame so that it is in a more stable condition during transportation. It will also be observed that the structure is strong and rugged, composed of parts which are readily fabricated and assembled, and highly efficient in operation and control.

While the embodiment of the invention illustrated on the drawings has been described with considerable particularity, it is to be expressly understood that the invention is not limited thereto, as the same is capable of receiving a variety of mechanical expressions, some of which will now readily suggest themselves to those skilled in the art, while other forms of mechanism for moving the carriage, raising and lowering the boom structure, extending and contracting the skid frame structure may be used, and changes may be made in the details of construction, proportion and sizes of parts, etc., without departing from the spirit of this invention. Reference is therefore to be had to the appended claims for a definition of the invention.

What is claimed is:

1. In apparatus of the character described, in combination with a base frame providing fore and aft extending tracks, a carriage mounted on said tracks, mechanism for moving said carriage forwardly and rearwardly on said tracks, skid frames mounted on said carriage, said skid frames providing a pair of tracks, an extension frame mounted on said last named tracks and having an upper transverse member, bail guide members respectively projecting upwardly from said carriage between said last named tracks and projecting downwardly from said transverse member, means mounted on said carriage and operatively connected to said transverse member for moving said extension frame on said last named tracks, and means for raising and lowering a load with respect to said skid frames and extension frame in all positions of the latter.

2. In apparatus of the character described, in combination with a base frame providing fore and aft extending tracks, a carriage mounted on said tracks, mechanism for moving said carriage forwardly and rearwardly on said tracks, skid frames mounted on said carriage, said skid frames providing a pair of tracks, an extension frame mounted on said last named tracks and having an upper transverse member, a pair of spaced bail guide members projecting upwardly from said carriage between said last named tracks, a single bail guide member projecting downwardly from said transverse member between said first named guide members, means mounted on said carriage and operatively connected to said transverse member for moving said extension frame on said last named tracks, and means for raising and lowering a load with respect to said skid frames and extension frame in all positions of the latter.

3. In apparatus of the character described, in combination with a base frame providing fore and aft extending tracks, a carriage mounted on said tracks, mechanism for moving said carriage forwardly and rearwardly on said tracks, a pair of spaced skid frames projecting upwardly from said carriage, an extension skid frame structure comprising a transverse member and a pair of downwardly projecting members movably mounted in said skid frames, means for raising and lowering said extension skid frame structure with respect to said skid frames in all positions of said carriage including hydraulic means mounted on said carriage and connected to said transverse member, and means for raising and lowering a load with respect to said skid frames and extension skid frame structure in all positions of said carriage and in all positions of said extension skid frame structure with respect to said skid frames including means separate from said carriage mounted on said base frame and means on said base frame for operating said last named means.

4. In apparatus of the character described, in combination with a base frame providing fore and aft extending tracks, a carriage mounted on said tracks, mechanism for moving said carriage forwardly and rearwardly on said tracks, a pair of spaced skid frames having guide surfaces and projecting upwardly from said carriage, an extension skid frame structure comprising a transverse member and a pair of downwardly projecting members movably mounted in said skid frames and having rearwardly facing surfaces in the same plane with the guide surfaces of said skid frames, means on said transverse member for suspending a load therefrom, means for raising and lowering said extension skid frame structure with respect to said skid frames in all positions of said carriage including hydraulic means mounted on said carriage and connected to said transverse member, and means for raising and lowering a load with respect to said skid frames and extension skid frame structure in all positions of said carriage and in all positions of said extension skid frame structure with respect to said skid frames including means separate from said carriage mounted on said base frame and means on said base frame for operating said last named means.

5. In apparatus of the character described, in combination with a base frame providing fore and aft extending tracks, a carriage mounted on said tracks, mechanism for moving said carriage forwardly and rearwardly on said tracks, a pair of spaced skid frames having guide surfaces and projecting upwardly from said carriage, an extension skid frame structure comprising a transverse member and a pair of downwardly projecting members movably mounted in said skid frames and having rearwardly facing surfaces in the same plane with the guide surfaces of said skid frames, bail guide members respectively mounted on said carriage and transverse member and providing guiding surfaces in the same transverse plane, means mounted on said carriage and operatively connected to said extension frame for raising and lowering the latter, and means mounted on said base frame for raising and lowering a load with respect to said carriage.

6. In apparatus of the character described, in combination with a base frame providing fore and aft extending tracks, a carriage mounted on said tracks, mechanism for moving said carriage forwardly and rearwardly on said tracks, a pair of spaced skid frames having guide surfaces and projecting upwardly from said carriage, an extension skid frame structure comprising a transverse member and a pair of downwardly projecting members movably mounted in said skid frames and having rearwardly facing surfaces in the same plane with the guide surfaces of said skid frames, an hydraulic device mounted on said carriage at its fore and aft medial line and operatively connected to said transverse member, and means mounted on said base frame for raising and lowering a load with respect to said carriage in all relative positions of said skid frame and extension frame.

GEORGE R. DEMPSTER.

REFERENCES CITED

The following references are of record in the file of this patent:

UNITED STATES PATENTS

| Number | Name | Date |
|---|---|---|
| 129,468 | Field | July 16, 1872 |
| 2,198,071 | Artini | Apr. 23, 1940 |
| 2,281,183 | Dempster | Apr. 28, 1942 |
| 2,325,568 | Eaton | July 27, 1943 |

FOREIGN PATENTS

| Number | Country | Date |
|---|---|---|
| 391,777 | Great Britain | Apr. 26, 1933 |